Feb. 12, 1963 E. S. JOLINE ETAL 3,077,557
FLIGHT PATH COMPUTER
Filed Sept. 30, 1960 2 Sheets-Sheet 1
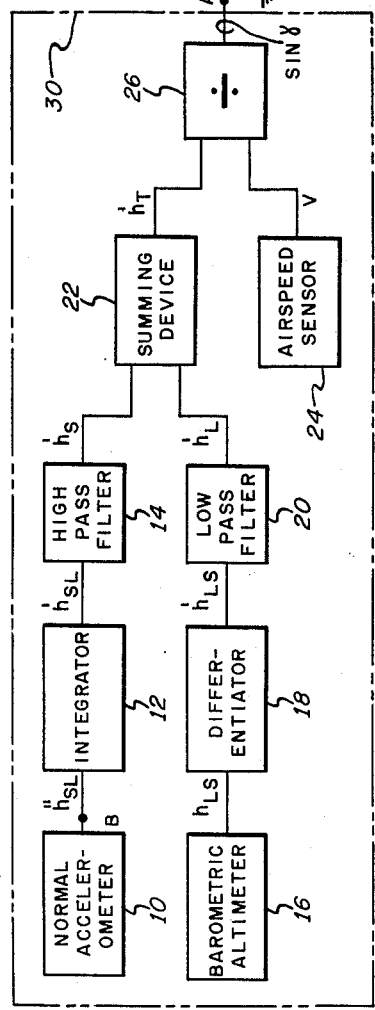
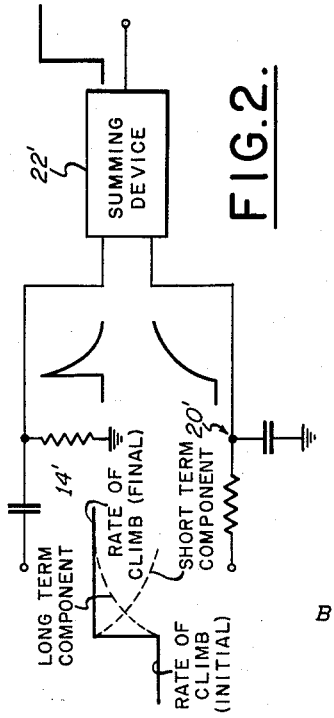
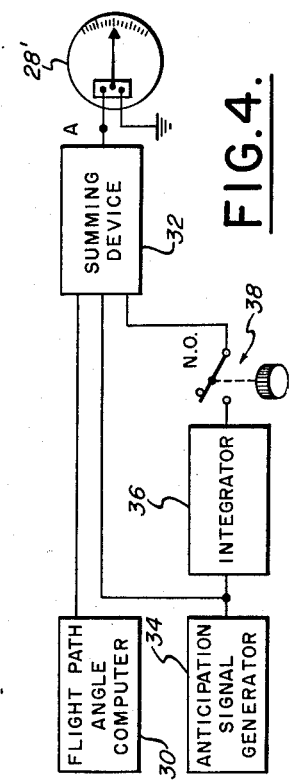
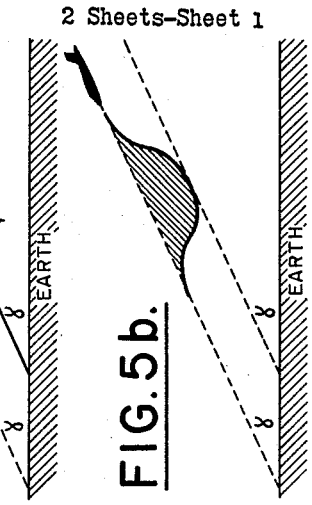
INVENTORS
EVERETT S. JOLINE
ROBERT C. SAUER
BY
ATTORNEY Feb. 12, 1963  E. S. JOLINE ETAL  3,077,557
FLIGHT PATH COMPUTER
Filed Sept. 30, 1960  2 Sheets-Sheet 2
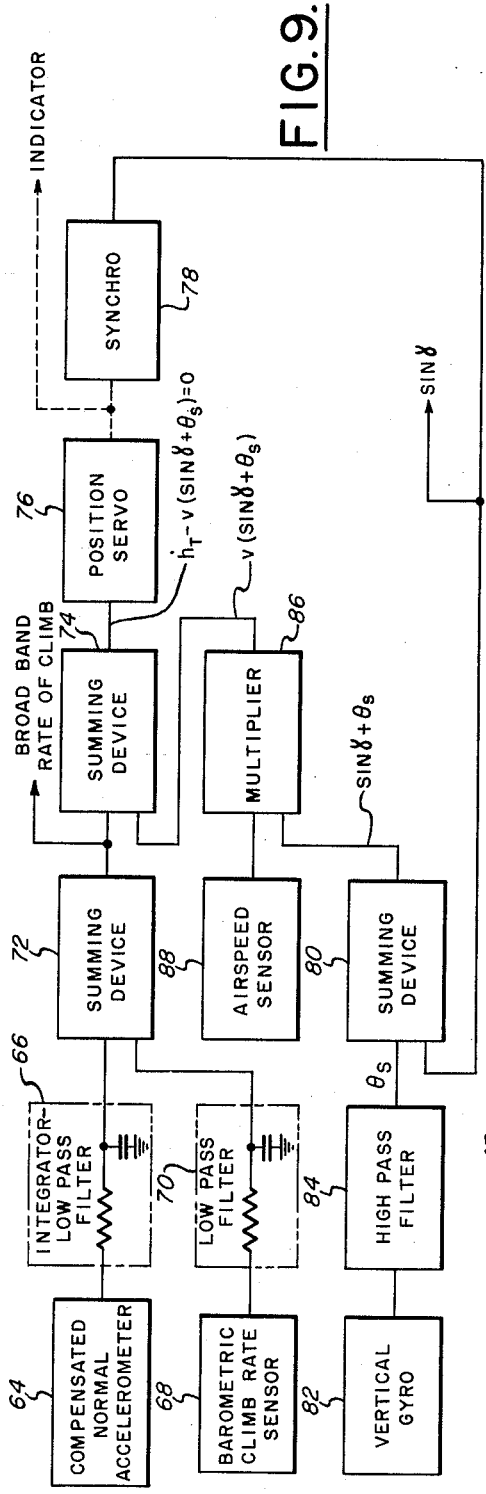
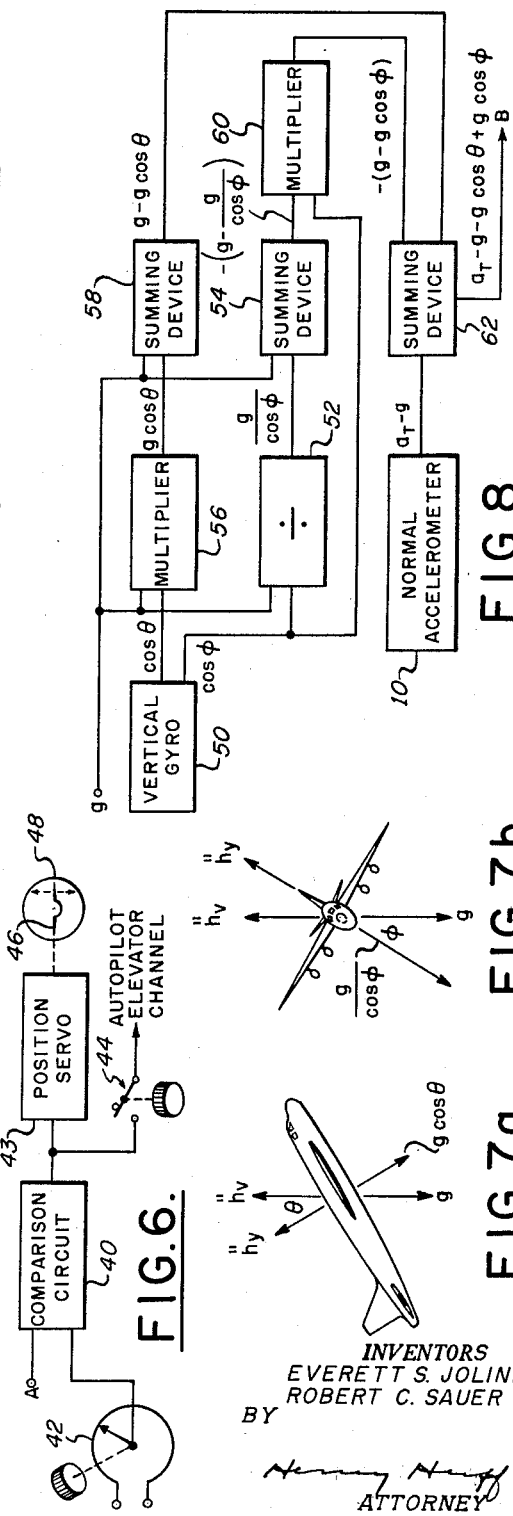
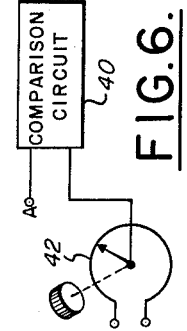
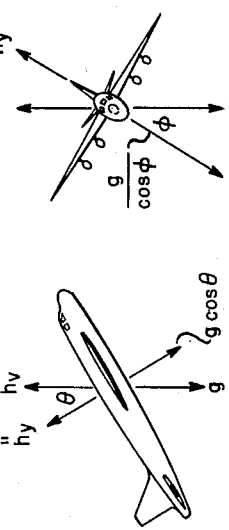
INVENTORS
EVERETT S. JOLINE
ROBERT C. SAUER
BY
ATTORNEY

United States Patent Office 3,077,557
Patented Feb. 12, 1963

3,077,557
FLIGHT PATH COMPUTER
Everett S. Joline, Huntington Station, and Robert C. Sauer, Rosedale, N.Y., assignors to Sperry Rand Corporation, Great Neck, N.Y., a corporation of Delaware
Filed Sept. 30, 1960, Ser. No. 59,768
17 Claims. (Cl. 318—489)

This invention relates generally to apparatus for use in controlling the flight of an aircraft and more particularly to apparatus for use in directing an aircraft to fly along a path that makes a particular angle, i.e. flight path angle, with respect to the earth.

Apparatus for computing the flight path angle of an aircraft as disclosed in U.S. Patent 2,896,145, issued in the name of R. Snodgrass and assigned to the assignee of this invention, requires that two different expressions for flight path angle be computed, one expression being computed to provide signals representing changes in flight path angle which occur over short time periods, i.e. short term flight path angle signals, and the other expression being computed to provide signals representing flight path angle changes which occur over extended time periods, i.e. long term flight path angle signals. The long term flight path angle signals are then used to monitor, i.e. control the level of, the short term flight path angle signals so that those signals represent the true flight path angle of a craft, regardless of how rapidly or slowly the flight path angle is changing. The "short term" and "long term" expressions computed by the above-mentioned patented apparatus are respectively:

$$\gamma = \theta - \alpha = \sin^{-1} \frac{\dot{h}}{V}$$

where:
$\theta$ = craft pitch attitude
$\gamma$ = flight path angle
$\dot{h}$ = rate of change of altitude or rate of climb
$V$ = craft velocity
$\alpha$ = angle of attack Apparatus embodying the present invention solves only the second of the above expressions, i.e.

$$\gamma = \sin^{-1} \frac{\dot{h}}{V}$$

and, to assure an accurate computation of flight path angle under all conditions, uses signals which always represent accurately the different terms of the expression. To produce a signal which always represents accurately the climb rate of an aircraft, apparatus embodying the present invention sums two separate climb rate signals, each of which is derived differently and is accurate under different conditions. The first climb rate signal is produced by integrating the output signal from an accelerometer measuring craft accelerations along the craft yaw axis, the yaw axis acceleration being substantially the same as the vertical acceleration when the craft pitch and roll angles are small. Since accelerometers are substantially unresponsive to slow changes in the craft climb rate, the integrated signal, i.e. the first climb rate signal, is passed through a high pass filter to remove unreliable long term, i.e. low frequency, climb rate components of the integrated accelerometer output signal. The second climb rate signal is produced by differentiating the output signal from a barometric altimeter. Since barometric altimeters are substantially unresponsive to short term, i.e. high frequency, altitude changes, the differentiated altitude signal, i.e. the second climb rate signal, is passed through a low pass filter to remove all unreliable short term climb rate components of the differentiated altimeter output signal. The two filtered climb rate signals are then summed to produce a composite climb rate signal which accurately represents the craft climb rate regardless of how fast or slow the craft changes its rate of climb. A signal, accurately representing the velocity of the craft under all conditions, is obtained then from a Pitot sensor and divided into the composite climb rate signal to provide a signal representing the sine of the craft flight path angle, or, if the flight path angle is small, the angle itself.

A principal object of the invention is to provide apparatus for computing the flight path angle of an aircraft.

Another object of the invention is to provide apparatus for controlling the flight path angle of the aircraft.

Another object of the invention is to provide apparatus for controlling the flight of an aircraft so that the craft flies along a path that makes a particular angle with respect to the earth.

Another object of the invention is to provide apparatus for synthesizing a broad band rate of change of altitude signal.

The invention will be described with reference to the figures, wherein:

FIG. 1 is a block diagram of a simple embodiment of the invention,

FIG. 2 is a schematic diagram useful in describing the operation of a portion of FIG. 1, FIG. 3 is a diagram useful in describing the operation of FIG. 1, FIG. 4 is a block diagram of apparatus for controlling the flight path angle of an aircraft, FIGS. 5a and 5b are diagrams useful in describing a feature of the apparatus of FIG. 4.

FIG. 6 is a block diagram which, when connected to point A of FIG. 4, adapts that apparatus for use with an autopilot and/or as a flight director, FIGS. 7a and 7b are diagrams useful in describing an improvement which may be made to the apparatus of FIG. 1, FIG. 8 is a block diagram of apparatus which, when substituted for an element of FIG. 1, provides an improved species of the invention, and FIG 9 is a block diagram of a presently preferred embodiment of the invention.

Referring to FIG. 1, an accelerometer 10, e.g. the accelerometer described in Massachusetts Institute of Technology Radiation Laboratory Series, McGraw Hill Book Co. Inc. 1948, volume 21, page 77, biased by a signal representing the acceleration due to gravity, provides a signal $\ddot{h}_{SL}$ representing the craft rate of change of climb rate which, as earlier mentioned, comprises accurate short term and unreliable long term components. The signal $\ddot{h}_{SL}$ is applied to an integrator 12 which operates to provide a signal $\dot{h}_{SL}$ representing the craft climb rate, the signal $\dot{h}_{SL}$ then being passed through a high pass filter 14 to remove the unreliable long term components from the climb rate signal and produce a climb rate signal $\dot{h}_S$ having only accurate short term components. A barometric altimeter 16 producing a signal $h_{LS}$ representing the altitude of the craft applies that signal to a differentiator 18 which operates to produce an output signal $\dot{h}_{LS}$ representing the craft rate of change of altitude, the signal $\dot{h}_{LS}$, as mentioned above, being comprised of reliable long term components and unreliable short term components. The differentiator output signal $\dot{h}_{LS}$ is passed through a low pass filter 20 to remove its unreliable short term components, thereby producing a signal $\dot{h}_L$ having only accurate long term components. The high pass filter 14 and the low pass filter 20, as will be explained later, have equal time constants and have their output signals applied to a summing device 22 which algebraically sums those signals to provide a signal $\dot{h}_T$ that always accurately represents the craft rate of change of altitude. An air speed sensor 28, e.g. a Pitot-static sensor, producing a signal V representing the velocity of the craft applies the signal V to a dividing circuit 26. The dividing circuit 26 also receives the signal $\dot{h}_T$ and operates to provide a quotient signal representing the craft velocity divided into the craft climb rate, i.e. the sine of the craft flight path angle. The air speed signal V need not be formed by synthesizing two signals, each of which is accurate in a different domain, since Pitot-static sensors produce signals accurately representing air speed in the usual range of rates of change of craft speed. The divider 26 output signal is then applied to an indicator 28, calibrated in units of flight path angle, to indicate the craft flight path angle.

To explain why the high pass filter 14 and the low pass filter 20 of FIG. 1 must have equal time constants, reference is made to FIG. 2. In FIG. 2 a simple resistance-capacitance high pass filter 14', e.g. the filter shown and described in Radiotron Designers Handbook, Wireless Press Publishers, 1953. page 183, FIG. 4.35A, and a simple resistance-capacitance low pass filter 20', e.g. the filter shown and described in Radiotron Designers Handbook, page 174, FIG. 4.37, are connected to a summing device 22'. With a signal representing a step change in the craft rate of climb (practically impossible because no craft can change its climb rate that abruptly) simultaneously applied to filters 14' and 20', the filter 14' will pass only the short term component of the input signal and the filter 20' will pass only the long term component of the input signal. Only when the filter 14' and the filter 20' time constants are equal will the summing device 22' produce a step output signal corresponding to the step change in the craft rate of climb. The operation of the circuit of FIG. 2 is analogous to the operation of the FIG. 1 elements 10–22 since, with a step change in the craft rate of climb, the high pass filter 14 passes a signal identical to the short term component shown in FIG. 2 and the filter 20 passes a signal identical to the long term component shown in FIG. 2. These signals are then summed to produce a step signal $\dot{h}_T$ representing the step change in the craft climb rate.

With a craft flying parallel to the earth, a determination by the pilot to fly at some flight path angle $\gamma$ (see FIG. 3), requires that the craft climb rate and/or velocity to be altered by, for example, changing the craft pitch attitude or angle of attack until the indicator 28 indicates the desired flight path angle $\gamma$. If the pilot changes the craft flight path angle by manipulating his control stick, he can change the craft flight path angle quickly or slowly by moving his control stick respectively a large or small amount from its neutral position. However, regardless of how much the pilot moves his control stick, he must, nevertheless, move the control stick in response to what is displayed on the indicator 28. Therefore, as the pointer of the indicator approaches the indicator indicia representing $\gamma$, the pilot must move his control stick back to its neutral position. If the pilot, in maneuvering to a flight path angle $\gamma$, moves the control stick only slightly from its neutral position, the pointer of the indicator 28 will move slowly to indicate the craft flight path angle and the craft will follow a slowly changing course, e.g. course A of FIG. 3, until the craft flies at, and the indicator indicates, the flight path angle $\gamma$. Then, the pilot will have to move the control stick back to its neutral position; otherwise, the craft will fly a "loop" maneuver. If, however, the pilot moves his control stick a large amount from its neutral position in order to assume the desired flight path angle $\gamma$ rapidly he will, by the time he responds to what is shown on the indicator 28, have flown through the desired flight path angle and will have to hunt for the desired flight path (see course B of FIG. 3) by moving his control stick back and forth until the indicator 28 steadily indicates the flight path angle $\gamma$.

To avoid any hunting whatever of a particular flight path angle, the apparatus of FIG. 4 is provided. Referring to FIG. 4, a flight path angle computer 30, identical to the computer of FIG. 1, applies a signal representing the sine of the craft flight path angle to a summing device 32. An anticipation signal generator 34, producing a signal proportional to the rate at which the craft flight path angle is changed, also applies its output signal to the summing device 32. The anticipation signal generator 34 may take many forms and, in its more obvious form, may be simply a differentiating device receiving and differentiating a signal representing the craft flight path angle. The anticipaiton signal generator 32 may also take the form of a high pass filter receiving and filtering craft pitch angle of attack or flight path angle signals since the magnitudes of the short term components of those signals are proportional to the rate that the craft changes its flight path angle. An anticipation signal generator providing short term pitch signals is described in detail later in conjunction with the presently preferred form of the invention. An integrator 36 receives the anticipation signal generator 34 output signal and applies its output signal to the summing device 32 when a normally open switch 38 is closed. An indicator 28', also calibrated in units of flight path angle, connects to the summing device 32 and is driven by the summing device 32 output signal. Since the indicator 28' is driven by a signal representing the sum of the flight path angle signal and the anticipation signal, it indicates the correct flight path angle only when the flight path angle is held constant, i.e. when the summing device 32 receives no flight path angle rate signals, short term pitch signals, etc. In other words, the indicator 28' will be in error in proportion to the rate of change of flight path angle. With the pilot changing the craft flight path angle slowly, a course similar to course A of FIG. 3 will be flown since the indicator 28' will operate substantially the same as the indicator 28, i.e. the anticipation signal and the indicator 28' error are each negligible. However, if the pilot changes his flight path angle rapidly, the anticipation signal generator 34 will provide a sizeable output signal which will cause the indicator 28' to indicate the desired flight path angle prematurely. This will require that the pilot, in order to keep the indicator 28' steadily indicating the desired flight path angle, gradually decrease to zero the rate that the craft flight path angle is being changed, threby causing the craft to make an asymptotic approach to a path making the desired flight path angle with the earth.

With the apparatus of FIG. 1, an aircraft may be controlled so that it flies at a particular flight path angle, but may not be controlled so that it flies along a particular path. At certain times, e.g. when landing or endeavoring to fly along a particular slant airway, control of a craft along a particular path is necessary. FIG. 5A illustrates what happens when a craft, employing the apparatus of FIG. 1, performs a landing maneuver and momentarily changes its flight path angle, e.g. in response to a wind gust, at a point P. As shown, recapturing of the desired flight path angle $\gamma$ results in the craft being displaced from the initial flight path by the distance D, thereby causing the craft to touchdown early. To assure that the craft always returns to its initial flight path, the apparatus of FIG. 4 includes the integrator 36 which integrates a signal proportional to the rate of change of flight path angle and, when the switch 38 is closed, applies that signal to the summing device 32. This causes the indicator 28' to have too much "anticipation." As a result, when the craft departs from a selected path, the pilot, in response to what is displayed on the indicator 28', moves his control stick more than is necessary to recapture the flight path angle $\gamma$, thereby causing the craft to return to its initial path. See FIG 5B. The integrator 36, in a sense, provides a signal representing the shaded area shown in FIG. 5B which causes the craft to return to its initial path.

At low craft speeds, the amount of "anticipation" required is greater than at high craft speeds since at low speeds more is demanded of the pilot to effect a given change in the craft flight path angle. For example, with the craft slowly flying at a particular flight path angle, any departure from the path will require a large movement of the craft control stick to recapture the desired flight path angle. In a preferred embodiment of the invention, the magnitude of the anticipation signal generator 34 output signal is made inversely proportional to the velocity of the craft. This may be achieved by any known technique, e.g. applying the anticipation signal to an amplifier, the bias of which varies inversely with the craft speed.

The apparatus of FIGS. 1 and 4 utilize similar indicators, each of which indicates the flight path angle of a craft. These apparatus may be modified for use with director type indicators, or for use with an autopilot, by connecting the apparatus of FIG. 6 to their respective points A. In FIG. 6, a comparison circuit 40 receives the signal at point A. A potentiometer 42, providing a signal representing the desired flight path angle, is also connected to the comparison circuit 40. The comparison circuit 40 output signal is applied to a position servo 43 and to the elevator channel of the craft autopilot through a switch 44. The position servo 43 connects to and positions the miniature airplane 46 of the indicator 48 away from its reference position in proportion to its input signal. Only when the airplane 46 is at its reference position on the indicator 48 does the craft fly at the flight path angle represented by the signal on the potentiometer 42 wiper.

As shown in FIGS. 7a and 7b, as the craft increases its pitch and bank angles, the vertical acceleration component $\bar{h}_V$ of the yaw axis acceleration $\ddot{h}_V$ varies as a function of the cosines of the roll and bank angles. In the case of banking, which is of concern since large craft bank angles are often experienced, the craft vertical acceleration component decreases as a function of the cosine of the bank angle $\phi$. Therefore, to derive a signal accurately representing the craft vertical acceleration, the bias applied to the accelerometer 10, in a preferred embodiment of the invention, is divided by the cosine of the craft bank angle. In addition, since the movable mass of the normal accelerometer 10 rotates in bank and pitch, it does not respond to the full gravitational acceleration, but responds only to components of the gravitational acceleration which vary in proportion to the cosines of the craft bank and pitch angles.

Referring to FIG. 8, apparatus adapted to be connected to point B of FIG. 1 in place of the accelerometer 10, provides the above discussed corrections. In FIG. 8, a vertical gyro 50, providing signals representing the cosines of the craft pitch and bank angles, applies a signal $\cos \phi$ representing the cosine of the craft bank angle to a divider 52, also receiving a signal $g$ representing the gravitational acceleration. The divider 52 output signal $$\frac{g}{\cos \phi}$$

is then applied to a summing device 54 and added to the signal $g$ to provide a signal $$-\left(g - \frac{g}{\cos \phi}\right)$$

which, if added to the accelerometer 10 output signal $a_T - g$ would provide the first correction mentioned above. To provide a signal for cancelling the error due to the accelerometer movable mass being rotated in pitch, the vertical gyro 50 applies a signal $\cos \theta$ to a multiplier 56 which also receives a signal $g$. The multiplier 56 output signal $g \cos \theta$ is then added to the signal $g$ in a summing device 58 to provide a signal $g - g \cos \theta$ which, when added to the accelerometer 10 output signal provides a bias which varies in proportion to the cosine of the craft pitch angle. To correct for the accelerometer movable mass being rotated in bank, the summing device 54 output signal is multiplied, in a multiplier 60, by the signal $\cos \phi$, thereby producing the signal $-(g - g \cos \phi)$. The signals $g - g \cos \theta$ and $-(g - g \cos \phi)$ are then added to the signal $a_T - g$ in a summing device 62 so that when the craft has zero pitch and bank angles, the summing device 62 output signal is $a_T - g$. Correspondingly, craft banking tends to increase the resultant bias and craft pitching tends to decrease the resultant bias.

If preferred, a vertical accelerometer could be substituted for the normal accelerometer 10 of FIG. 1, thereby obviating the need for the apparatus of FIG. 8. This substitution, however, would require that complex stabilizing equipment be employed to maintain the accelerometer axis aligned perpendicular to the earth.

Referring to FIG. 9, the presently preferred form of the invention has a compensated normal accelerometer 64, e.g. the apparatus of FIG. 8, which applies a signal representing the craft vertical acceleration to an integrator-low pass filter 66. A barometric climb rate sensor 68, e.g. elements 16 and 18 of FIG. 1, applies its output signal to a low pass filter 70. The integrator-filter 66 and the low pass filter 70 apply their output signals to a summing device 72. The summing device 72 then applies its output signal to a summing device 74, the output signal of which drives a position servo 76. The servo 76 drives an indicator, e.g. the indicator of FIG. 1, and a synchro 78 which converts the servo shaft rotation to a representative electrical signal which is fed to a summing device 80. Also applied to the summing device 80 is an anticipation signal produced by passing pitch signals from a vertical gyro 82 through a high pass filter 84. The summing device 80 then applies its output signal to a multiplier 86 which also receives a velocity signal from an air speed sensor 88. The multiplier 86 output signal is then applied to the summing device 74.

The integrator-low pass filter 66 may, at first glance, appear to defeat the purpose of the invention since a high pass filter is used in the accelerometer channel of FIG. 1. However, as will be presently explained, the integrator-low pass filter 66, not only may be employed, but actually reduces the complexity of the equipment. When the integrator-low pass filter 66 receives a signal from the accelerometer 64, it passes long term components of the acceleration signal, while blocking short term components. However, the short term components of the acceleration signal are integrated by the filter thereby producing the desired short term climb rate signal at the output of the integrator-low pass filter. While long term acceleration signals are also passed by the integrator-low pass filter, they have substantially no effect on the operation of the apparatus of FIG. 9 since they are almost negligible to begin with, the accelerometer 64 being substantially unresponsive to the commonly experienced low level of long term acceleration changes.

The summing device 72, receiving a short term climb rate signal and a long term climb rate signal operates, like the summing device 22 of FIG. 1, to produce a composite broad band climb rate signal. This climb rate signal and the signal from the multiplier 86 then cause the servo 76, in conventional manner, to drive to a null position, thereby providing a signal $\sin \gamma$ and driving the indicator so that a desired flight path angle may be "anticipated."

While it has not been shown, the climb rate sensor 68 output signal may be applied to the integrator-low pass filter 66 along with the accelerometer 64 output signal, thereby obviating the need for the low pass filter 70 and the summing device 72. In addition, while an air speed sensor is employed to provide a signal $v$, further improvements in the accuracy of the invention may be achieved by replacing the air speed sensor with a device that provides a signal representing either true air speed or ground speed.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for computing the flight path angle of an aircraft comprising means producing signals representing short term variations in the craft rate of climb, means producing signals representing long term variations in the craft climb rate, means producing a signal representing the speed of said craft, and means receiving said long and short term climb rate signals and said speed signal and producing a signal representing the quotient of the sum of said long and short term climb rate signals divided by said speed signal, said quotient signal representing the flight path angle of said craft.

2. Apparatus for producing a signal representing the flight path angle of an aircraft comprising means responsive to short term variations in the climb rate of said aircraft to produce a first climb rate signal, means responsive to long term climb rate variations to produce a second climb rate signal, means producing a signal representing the speed of said craft, and means receiving said first and second climb rate signals and said speed signal producing an output signal representing the sum of said climb rate signals divided by said speed signal, said output signal being the desired flight path angle signal.

3. Apparatus for computing the flight path angle of an aircraft comprising means producing signals representing short term variations in the craft rate of climb, means producing signals representing long term variations in the craft rate of climb, means receiving said long and short term signals producing a signal representing their sum, means producing a signal representing the speed of said craft, and means receiving said sum and speed signals producing a signal representing the quotient of said sum signal divided by said speed signal, said quotient signal being representative of said craft flight path angle.

4. Apparatus for providing a flight path angle control signal comprising means producing signals representing short term variations in the craft rate of climb, means producing signals representing long term variations in the craft climb rate, means producing a signal representing the speed of said craft, means producing a signal that varies in proportion to the rate of change of flight path angle, and means receiving said last mentioned signal, said long and short term climb rate signals and said speed signal and producing a control signal representing the sum of said signal varying in proportion to said flight path angle rate and a signal representing the quotient of the sum of said long and short term climb rate signals divided by said speed signal.

5. The apparatus of claim 4 wherein said signal varying in proportion to the rate of change of flight path angle is a signal representing short term variations in the pitch of said aircraft.

6. The apparatus of claim 4 wherein said signal varying in proportion to the rate of change of flight path angle is a signal representing short term variations in the angle of attack of said aircraft.

7. The apparatus of claim 4 including means operable with said means producing a signal varying in proportion to said rate of change of flight path angle to increase and decrease the magnitude of said signal when the speed of said craft respectively decreases and increases.

8. Apparatus for producing a flight path angle control signal comprising means responsive to short term variations in the climb rate of said aircraft to produce a first climb rate signal, means responsive to long term climb rate variations to produce a second climb rate signal, means producing a signal representing the speed of said craft, and means receiving said first and second climb rate signal and said speed signal producing an output signal, and means responsive to short term variations in said output signal to apply a signal representing those variations to said means receiving said climb rate and speed signals, said last mentioned means output signal being the control signal and representing the sum of said signal representing short term variations in said output control signal and a signal representing the quotient of said speed signal divided into a signal representing the sum of said climb rate signals.

9. Apparatus for computing the flight path angle of an aircraft comprising means producing a first craft rate of climb signal accurate in response to short term changes in rate of climb, means producing a second craft rate of climb signal accurate in response to long term rate of climb changes, a high pass filter and a low pass filter receiving respectively said first and second rate of climb signals, said first and second filters having equal time constants, means producing a signal representing the speed of said craft, and means receiving said filter output signals and said speed signal producing a signal representing the quotient of the sum of the filter output signals divided by said craft speed signal.

10. The apparatus of claim 9 wherein said means producing a first craft rate of climb signal comprises means providing a signal representing the normal acceleration of said craft and integrating means coupled to receive the acceleration signal producing a signal representing the time integral of said acceleration, and wherein said means producing a second craft rate of climb signal comprises means producing a signal representing barometric pressure and means receiving said pressure signal producing a signal proportional to the rate of change of said pressure signal.

11. Apparatus for producing a broad band signal representing the rate of climb of vehicle comprising means producing a first craft rate of climb signal accurate in response to short term changes in rate of climb, means producing a second craft rate of climb signal accurate in response to long term rate of climb changes, a high pass filter and a low pass filter receiving respectively said first and second rate of climb signals, said first and second filters having equal time constants, and means receiving and summing said filter output signals to provide the broad band rate of climb signal.

12. Apparatus for producing a control signal for guiding an aircraft along a particular path in space comprising means producing signals representing short term variations in the craft rate of climb, means producing signals representing long term variations in the craft climb rate, means producing a signal representing the craft speed, means producing a signal that varies in proportion to the rate of change of flight path angle, means producing a signal representing the time integral of a signal that varies in proportion to the rate of change of the craft flight path angle, means receiving said signal varying in proportion to the rate of change of flight path angle, said time integral signal, said long and short term climb rate signals and said speed signal and producing a control signal representing the sum of said signal varying in proportion to the craft flight path angle rate of change, said signal varying in proportion to the time integral of the rate of change of flight path angle and a signal representing the quotient of the sum of said long and short term climb rate signals divided by said speed signal.

13. Apparatus for flying an aircraft at a predetermined flight path angle comprising means producing a first craft rate of climb signal accurate in response to short term changes in rate of climb, means producing a second craft rate of climb signal accurate in response to long term rate of climb changes, a high pass filter and a low pass filter receiving respectively said first and second rate of climb signals, said first and second filters having equal time constants, means producing a signal representing the speed of said craft, means producing a signal that varies in proportion to the rate of change of flight path angle, means receiving said last mentioned signal, said filter output signals and said speed signal producing a control signal representing the sum of said signal that varies in proportion to the flight path angle change rate and a signal representing the quotient of the sum of the filter output signals divided by said craft speed signal, and flight path angle indicating means responsive to indicate the magnitude of said control signal.

14. Apparatus for producing a flight path angle control signal comprising apparatus for flying an aircraft at a predetermined flight path angle comprising means producing a first craft rate of climb signal accurate in response to short term changes in rate of climb, means producing a second craft rate of climb signal accurate in response to long term rate of climb changes, a high pass filter and a low pass filter receiving respectively said first and second rate of climb signals, said first and second filters having equal time constants, means producing a signal representing the speed of said craft, means producing a signal that varies in proportion to the rate of change of flight path angle, and means receiving said last mentioned signal, said filter output signals and said speed signal producing a control signal representing the sum of said signal that varies in proportion to the flight path angle change rate and a signal representing the quotient of the sum of the filter output signals divided by said craft speed signal.

15. Apparatus for producing a flight path angle control signal comprising apparatus for flying an aircraft at a predetermined flight path angle comprising means producing a first craft rate of climb signal accurate in response to short term changes in rate of climb, means producing a second craft rate of climb signal accurate in response to long term rate of climb changes, a high pass filter and a low pass filter receiving respectively said first and second rate of climb signals, said first and second filters having equal time constants, means producing a signal representing the speed of said craft, means producing a signal that varies in proportion to the rate of change of flight path angle, means receiving said last mentioned signal, said filter output signals and said speed signal producing a control signal representing the sum of said signal that varies in proportion to the flight path angle change rate and a signal representing the quotient of the sum of the filter output signals divided by said craft speed signal, means producing a signal representing a desired flight path angle, and comparison means receiving said control signal and said desired flight path angle signal producing an error signal representing the amount the instantaneous flight path angle differs from the desired flight path angle.

16. Apparatus for producing a flight path angle control signal comprising apparatus for flying an aircraft at a predetermined flight path angle comprising means producing a first craft rate of climb signal accurate in response to short term changes in rate of climb, means producing a second craft rate of climb signal accurate in response to long term rate of climb changes, a high pass filter and a low pass filter receiving respectively said first and second rate of climb signals, said first and second filters having equal time constants, means producing a signal representing the speed of said craft, means producing a signal that varies in proportion to the rate of change of flight path angle, means receiving said last mentioned signal, said filter output signals and said speed signal producing a control signal representing the sum of a signal that varies in proportion to the flight path angle change rate and a signal representing the quotient of the sum of the filter output signals divided by said craft speed signal, means producing a signal representing a desired flight path angle, comparison means receiving said control signal and said desired flight path angle signal producing an error signal representing the amount the instantaneous flight path angle differs from the desired flight path angle, and indicating means responsive to indicate the magnitude of said error signal.

17. Apparatus for producing a signal representing the rate of change of altitude of a craft comprising barometric climb rate sensing means producing a signal representing the rate of climb of said craft, means producing a signal representing the vertical acceleration of said craft, and low pass filtering means receiving both said signals and passing a composite signal representing the sum of the long term components of said climb rate signal and the integrated short term components of said vertical acceleration signal, said filtering means, therefore, being simultaneously a filter for the barometric climb rate signal and an integrator for the vertical acceleration signal.

References Cited in the file of this patent

UNITED STATES PATENTS

| | | |
|---|---|---|
| 2,896,145 | Snodgrass | July 21, 1959 |
| 2,950,431 | Wright | Aug. 23, 1960 |

Disclaimer 3,077,557.—*Everett S. Joline*, Huntington Station, and *Robert C. Sauer*, Rosedale, N.Y. FLIGHT PATH COMPUTER. Patent dated Feb. 12, 1963. Disclaimer filed Oct. 21, 1965, by the assignee, *Sperry Rand Corporation*.

Hereby enters this disclaimer to claim 17 of said patent.

[*Official Gazette April 19, 1966.*]